United States Patent
Ohzawa (10) Patent No.: US 9,838,560 B2
(45) Date of Patent: Dec. 5, 2017

(54) LIGHT GUIDE, ILLUMINATING DEVICE AND IMAGE READING APPARATUS

(71) Applicant: KONICA MINOLTA, INC., Chiyoda-ku, Tokyo (JP)

(72) Inventor: Satoko Ohzawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/993,467

(22) Filed: Jan. 12, 2016

(65) Prior Publication Data
US 2016/0212293 A1    Jul. 21, 2016

(30) Foreign Application Priority Data
Jan. 20, 2015    (JP) ................. 2015-008541

(51) Int. Cl.
| H04N 1/04 | (2006.01) |
| H04N 1/10 | (2006.01) |
| F21V 8/00 | (2006.01) |
| G02B 6/00 | (2006.01) |

(52) U.S. Cl.
CPC ........... *H04N 1/04* (2013.01); *G02B 6/001* (2013.01); *H04N 1/1061* (2013.01); *G02B 2006/0098* (2013.01)

(58) Field of Classification Search
CPC ....... H04N 1/04; H04N 1/1061; G02B 6/0001
See application file for complete search history.

(56) References Cited

U.S. PATENT DOCUMENTS

| | | | | |
|---|---|---|---|---|
| 5,499,112 A | * | 3/1996 | Kawai | G02B 6/0001 347/3 |
| 6,127,675 A | * | 10/2000 | Nakamura | H04N 1/02815 250/227.26 |
| 6,204,938 B1 | * | 3/2001 | Horiuchi | G02B 6/0055 358/475 |
| 6,259,082 B1 | * | 7/2001 | Fujimoto | H04N 1/031 250/208.1 |
| 6,464,366 B1 | * | 10/2002 | Lin | G02B 6/0033 358/484 |
| 6,496,285 B1 | * | 12/2002 | Fujimoto | H04N 1/02815 358/475 |
| 7,088,905 B1 | * | 8/2006 | Nemoto | G02B 6/0038 362/610 |

(Continued)

FOREIGN PATENT DOCUMENTS

| JP | 2012-248489 A | 12/2012 |
| JP | 2014216923 A | * 11/2014 |

*Primary Examiner* — Cheukfan Lee
(74) *Attorney, Agent, or Firm* — Buchanan Ingersool & Rooney PC (57) ABSTRACT

A light guide configured to cause light entering from a point light source to exit as linear light. The light guide has a rod portion extending in a first direction and having a reflecting surface. A plurality of reflecting elements are provided on the reflecting surface to reflect the light entering from the point light source. A part of the reflecting elements located closer to the point light source than a center of the rod with respect to the first direction is arranged so as to sheer away from a strongly illuminated area of the reflecting surface, which is an area illuminated strongly with light entering the rod portion, in a second direction parallel to the reflecting surface and perpendicular to the first direction.

14 Claims, 5 Drawing Sheets

(56) References Cited

U.S. PATENT DOCUMENTS

| | | | | |
|---|---|---|---|---|
| 8,240,902 B2* | 8/2012 | Fujimoto | ............... | G02B 6/001 |
| | | | | 362/217.01 |
| 8,488,216 B2* | 7/2013 | Sakamoto | ............ | G02B 6/0038 |
| | | | | 358/474 |
| 2006/0165370 A1* | 7/2006 | Nemoto | ............... | G02B 6/0038 |
| | | | | 385/146 |
| 2009/0034024 A1* | 2/2009 | Kim | ................... | H04N 1/02815 |
| | | | | 358/475 |
| 2009/0218525 A1* | 9/2009 | Ikeda | ................... | G02B 6/0036 |
| | | | | 250/559.07 |
| 2010/0245943 A1* | 9/2010 | Suyama | ............... | G02B 6/0038 |
| | | | | 358/475 |
| 2012/0320599 A1* | 12/2012 | Tanaka | ............... | H04N 1/02835 |
| | | | | 362/296.01 |
| 2014/0313738 A1* | 10/2014 | Tanaka | ................... | G02B 6/001 |
| | | | | 362/298 |
| 2015/0181070 A1* | 6/2015 | Tanaka | ................... | G02B 6/001 |
| | | | | 358/475 |

* cited by examiner

LIGHT GUIDE, ILLUMINATING DEVICE AND IMAGE READING APPARATUS

This application claims benefit of priority to Japanese Patent Application No. 2015-008541 filed Jan. 20, 2015, the content of which is incorporated herein by reference.

BACKGROUND OF THE INVENTION

1. Field of the Invention

The present invention relates to a light guide, an illuminating device and an image reading apparatus, and more particularly to an image reading apparatus configured to optically reading a document image by reading light reflected from the document, and a light guide and an illuminating device suited to be used in such an image reading apparatus.

2. Description of Related Art

An image reading apparatus which is commonly called a scanner illuminates an object to be read with linear light and reads light reflected therefrom. In the past, a fluorescent lamp has been usually used as a source of the linear light illuminating the object to be read. In recent years, however, for the purpose of electric power saving, a movement to replace the fluorescent lamp with an LED is being advanced. An LED is a point light source. Therefore, in order to permit an LED to be used as a light source in an image reading apparatus, as disclosed in Japanese Patent Laid-Open Publication No. 2012-248489, the LED is usually used together with a light guide so that linear light can be achieved. This kind of light guide (which will hereinafter be referred to as a conventional light guide) reflects light emitted from an LED with prisms provided therein and directs the reflected light toward an object to be read. However, from the nature of the conventional light guide to reflect light emitted from an LED with prisms provided therein, it is difficult to achieve proper light quantity distribution on the object to be read, that is, it is difficult to achieve proper light distribution with the conventional light guide.

SUMMARY OF THE INVENTION

An object of the present invention is to provide a light guide, an illuminating device and an image reading apparatus that contribute to proper light distribution.

A first embodiment of the present invention is a light guide configured to cause light entering from a point light source to exit as linear light, the light guide comprising: a rod portion extending in a first direction and having a reflecting surface on which a plurality of reflecting elements are provided to reflect the light entering from the point light source, wherein a part of the reflecting elements located closer to the point light source than a center of the rod portion with respect to the first direction is arranged so as to sheer away from a strongly illuminated area of the reflecting surface, which is an area illuminated strongly with light entering the rod portion, in a second direction parallel to the reflecting surface and perpendicular to the first direction.

A second embodiment of the present invention is an illuminating device comprising a point light source and the above-described light guide.

A third embodiment of the present invention is an image reading apparatus comprising the above-described illuminating device and an image pick-up element configured to receive light emitted from the point light source and reflected by a document.

DETAILED DESCRIPTION OF THE PREFERRED EMBODIMENTS

A light guide, an illuminating device and an image reading apparatus according to preferred embodiments will hereinafter be described with reference to the drawings.

Structure of Image Reading Apparatus; See FIG. 1

In the following, a main-scanning direction of an image reading apparatus according to an embodiment will be referred to as x-direction. A sub-scanning direction of the image reading apparatus will be referred to as y-direction. The up-down direction of the image forming apparatus will be referred to as z-direction. The upstream side in the sub-scanning direction is a negative side in y-direction, and the upstream side in the main-scanning direction is a negative side in x-direction.

Figure 1:
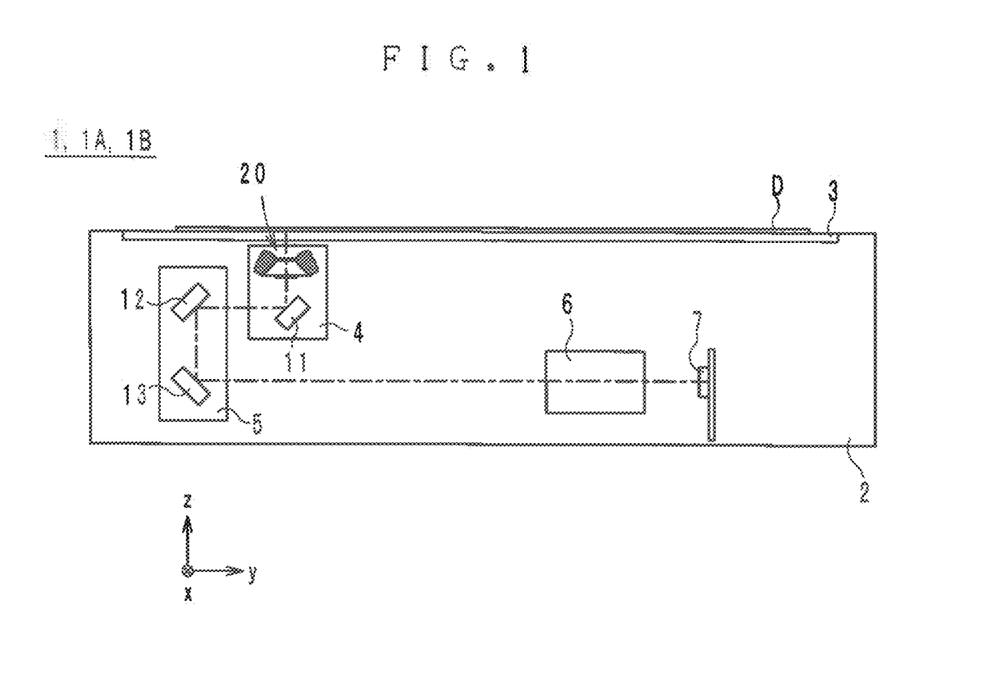
FIG. 1 is a schematic view illustrating the internal structure of an image reading apparatus according to an embodiment.

As illustrated in FIG. 1, the image reading apparatus 1 comprises a body 2, a document glass 3, a first slider unit 4, a second slider unit 5, a focusing lens 6, an image pick-up element 7, mirrors 11, 12 and 13, and an illuminating device 20.

The body 2 is a casing in the shape of a rectangular parallelepiped, and the document glass 3, the first slider unit 4, the second slider unit 5, the focusing lens 6, the image pick-up element 7, the mirrors 11, 12 and 13, and the illuminating device 20 are fitted to the body 2. The document glass 3 is a rectangular transparent plate fitted in an opening made in the upper surface of the body 2. A document D is placed on a supporting surface of the document glass 3, which is the upper surface of the document glass 3, with its side to be read down.

The illuminating device 20 emits light from two rod portions 34 and 36 of a light guide 30 provided therein and thereby illuminates the document D via the document glass 3 from two directions. A detailed description of the illuminating device 20 will be given later.

As illustrated in FIG. 1, the mirror 1 receives light reflected from the document D and directs the light to the negative side in y-direction. The mirror 12 receives light from the mirror 11 and reflects the light downward. The mirror 13 receives light from the mirror 12 and reflects the light to the positive side in y-direction.

The illuminating device 20 and the mirror 11 are, as seen in FIG. 1, mounted on the first slider unit 4. During image reading of the document D, the first slider unit 4 is moved along the lower surface of the document glass 3 to the positive side in y-direction at a speed of V by a mechanism (not illustrated) such as a motor, a belt, a pulley or the like.

The mirrors 12 and 13 are, as seen in FIG. 1, mounted on the second slider unit 5. During image reading of the document D, the second slider unit 5 is moved under the lower surface of the document glass 3 to the positive side in y-direction at a speed of V/2 by a mechanism (not illustrated) such as a motor, a belt, a pulley or the like. Accordingly, during the movements of the slider units 4 and 5, the optical path length between the read surface of the document D and the image pick-up document 7 is kept constant.

The focusing lens 6 forms an optical image obtained by light on the image pick-up element 7. The image pick-up element 7 is a light-receiving element configured to receive light reflected from the document D. Specifically, the image pick-up element 7 is a line sensor, such as a CCD camera or the like. The image pick-up element 7 has a linear image pick-up area extending in x-direction, and picks up the image of the document D by scanning the optical image formed by the focusing lens 7 over the linear image pick-up area.

In the image reading apparatus 1 having the structure above, during image reading of the document D, the illuminating device 20 emits light toward the document D, and light reflected from the document D is reflected by the mirrors 11, 12 and 13 sequentially. The light reflected by the mirror 13 enters the focusing lens 6 and is focused on the image pick-up element 7 by the focusing lens 6. The image pick-up element 7 carries out photoelectric conversion pixel by pixel in accordance with the intensity of incident light to generate image signals (RGB signals) corresponding to the document image, and the image pick-up element 7 sends these signals to a controller (not illustrated).

Structure of Illuminating Device; See FIGS. 2-8

Figure 2:
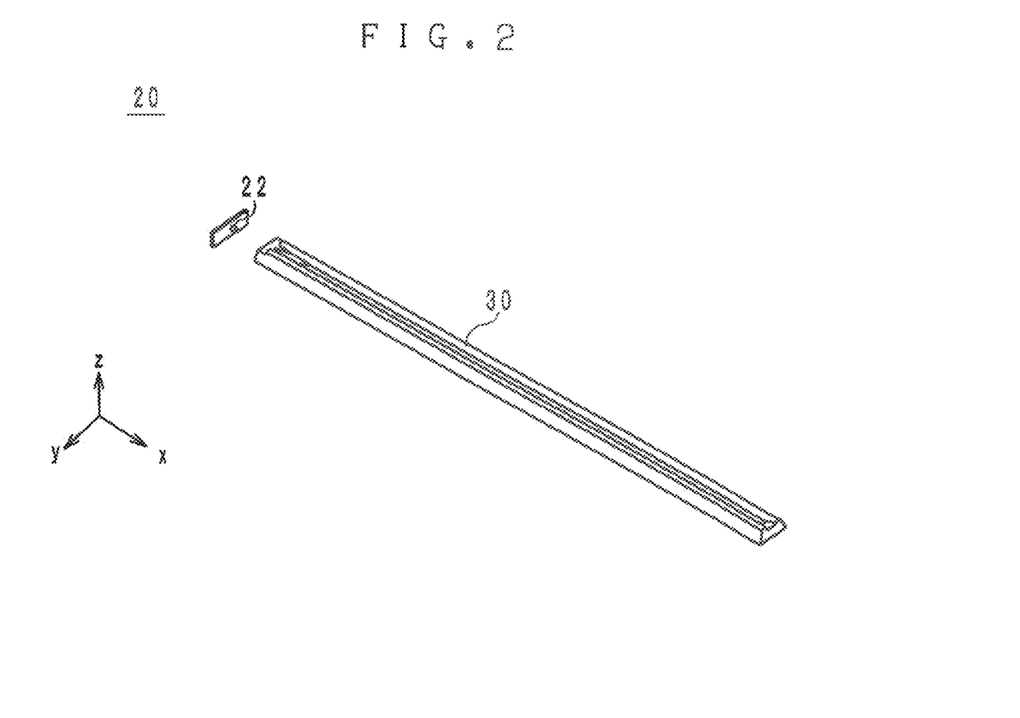
FIG. 2 is a perspective view of an illuminating device according to an embodiment.

The illuminating device 20, as a whole, is rod-shaped and extends in x-direction. The illuminating device 20 comprises a point light source 22 and a light guide 30.

The point light source 22 is an LED located at an end of the illuminating device 20 on the negative side in x-direction. The LED emits white light and has a half-value angle of 120 degrees.

The light guide 30 includes a beam splitter 32, two rod portions 34 and 36, and a base 38.

Figure 3:
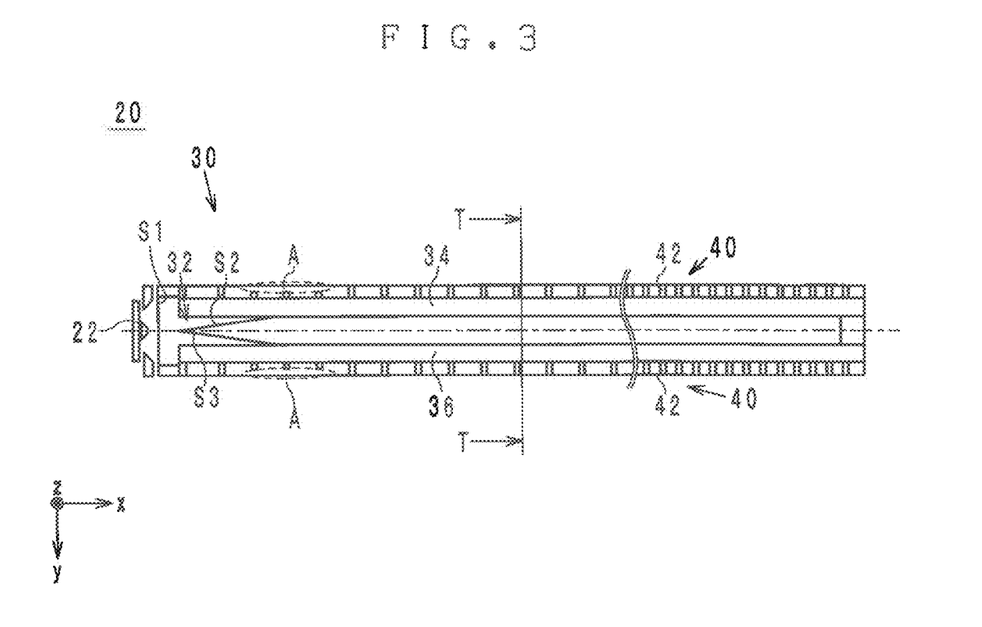
FIG. 3 is a plan view of the illuminating device when viewed from a direction perpendicular to a supporting surface of a document glass.

A light beam enters the light guide 30 through an input surface S1, which is an end surface of the light guide 30 on the negative side in x-direction. As seen in FIG. 3, the beam splitter 32 splits the light beam entering through the input surface S1 in two and directs the two light beams to the two rod portions 34 and 36 respectively. The beam splitter 32 is made of resin, for example PMMA (polymethylmethacrylate), or glass, and is V-shaped when viewed from z-direction. The pointed tip of the V shape is located on the negative side in x-direction and on the optical axis of the point light source 22 when viewed from the z-direction.

A light beam enters the beam splitter 32 through the input surface S1 and is incident on splitting surfaces S2 and S3 of the beam splitter 32 on the positive side in x-direction. The light beam incident on the splitting surface S2 is reflected to the negative side in y-direction and is directed to the rod portion 34. The light beam incident on the splitting surface S3 is reflected to the positive side in y-direction and is directed to the rod portion 36.

Figure 5:
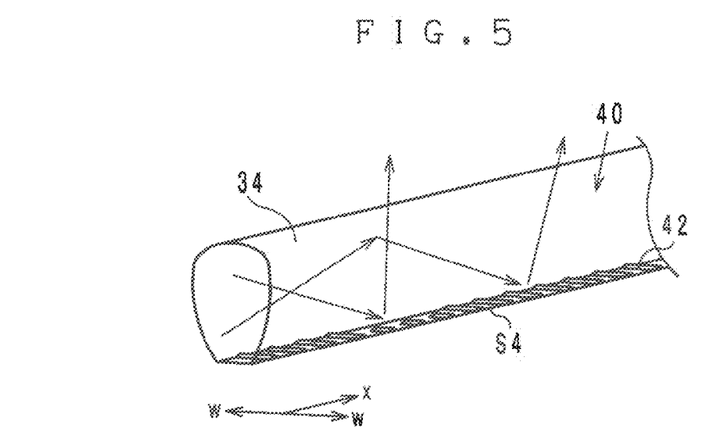
FIG. 5 is a perspective view of a light guide according to an embodiment.

The rod portion 34 is made of resin, for example PMMA (polymethylmethacrylate), or glass, and extends in x-direction. A cross section of the rod portion 34 is like an oval truncated at a lower portion having a greater curvature. As seen in FIG. 5, projections or dents 42 serving as reflecting elements (prisms) are formed on a reflecting surface S4 at the bottom of the rod portion 34. Specifically, the projections or dents 42 are linear projections or grooves extending in a direction (which will be hereinafter referred to as w-direction) parallel to the reflecting surface S4 and perpendicular to x-direction.

The light beam directed from the beam splitter 32 into the rod portion 34 propagates in the main-scanning direction while being total-reflected repeatedly inside the rod portion 34. In the meantime, a part of the propagating light beam is reflected by the reflecting elements 40 provided at the bottom of the rod portion 34, and the reflected light exits the rod portion 34 toward the document D through an output surface at the top of the rod portion 34.

Figure 6:
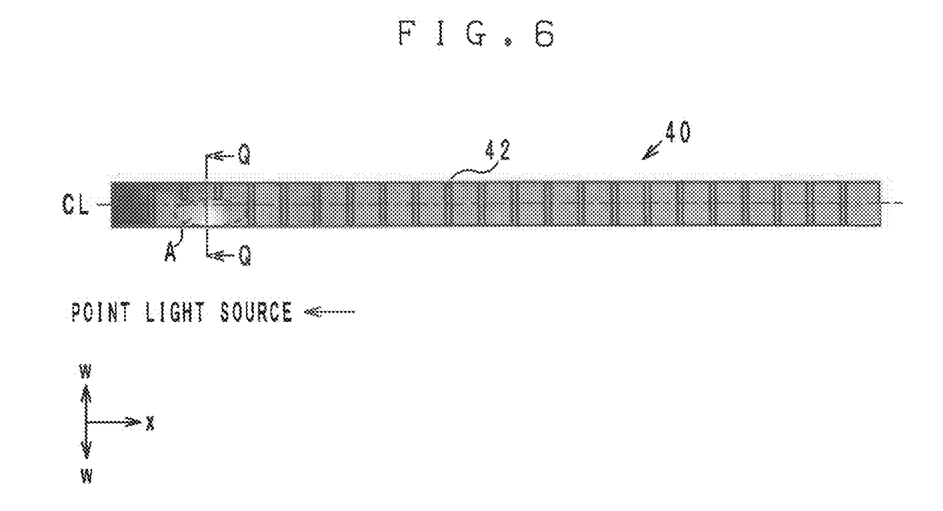
FIG. 6 is a view indicating light quantity distribution on a reflecting surface of a rod portion of the light guide according to the embodiment.
Figure 7:
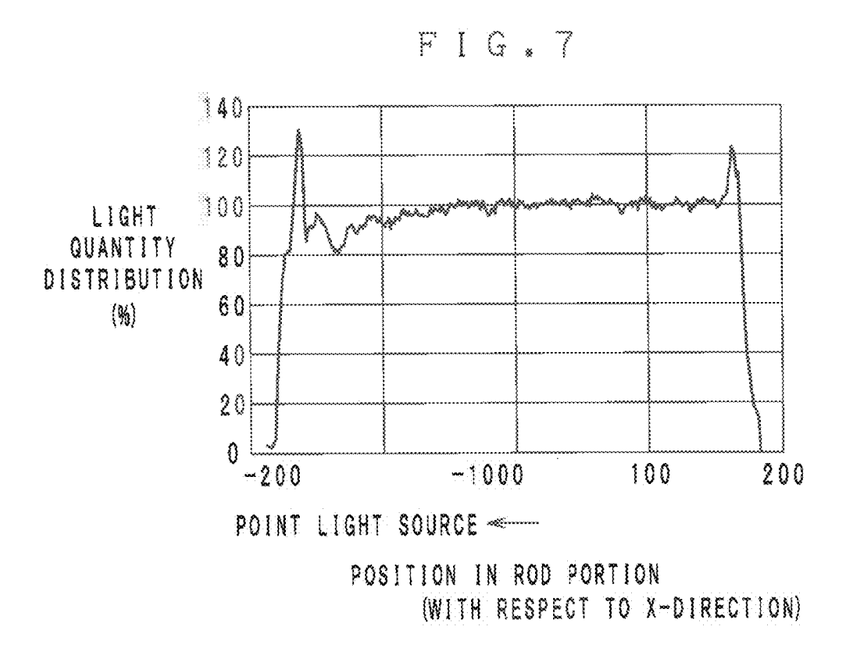
FIG. 7 is a graph indicating light quantity distribution in an extending direction of the rod portion of the light guide according to the embodiment.

As seen in FIG. 3, on the reflecting surface S4, there is an area A where none of the projections or dents 42, that is, none of the reflecting elements 40 is provided. This area A of the reflecting surface S4 is illuminated with light entering from the point light source 22 directly and light emitted from the point light source 22 and reflected by the beam splitter 32. Accordingly, the area A is illuminated with stronger light than any other part of the reflecting surface S4. FIG. 6 indicates a light quantity distribution on the reflecting surface S4, and the portion illuminated with stronger light is indicated as a lighter portion. As seen in FIG. 6, the area A is a portion illuminated with stronger light. The area A is in a part of the rod portion 34 closer to the light source 22 than the center with respect to x-direction of the rod portion 34. More specifically, as seen in FIG. 3, with respect to x-direction, the area A is substantially in the same position as the end of the beam splitter 32 on the positive side in x-direction. Also, the area A is in an outer portion of the light guide 30 from a center line CL dividing the reflecting surface S4 into two halves in w-direction (see FIG. 8). Accordingly, around the area A, the projections or dents 42 are arranged only in an inner portion of the light guide 30 from the center line CL so as to avoid the area A. The outer portion of the light guide 30 means the part of the rod portion 34 substantially on the negative side in y-direction or the part of the rod portion 36 substantially on the positive side in y-direction.

Figure 4:
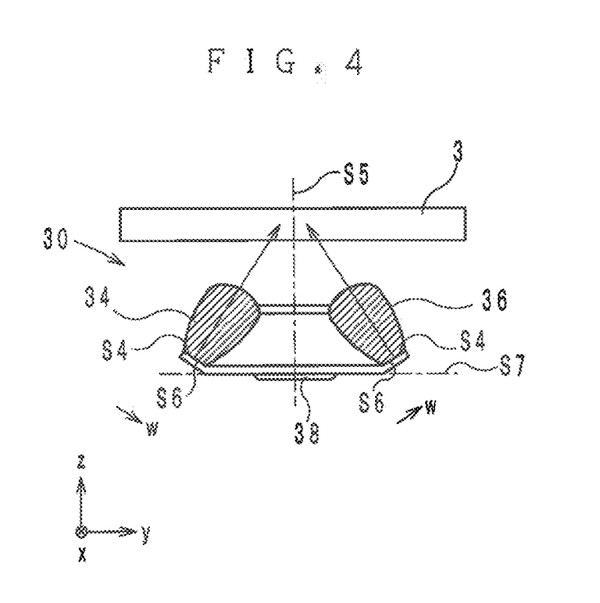
FIG. 4 is a sectional view of the illuminating device and the document glass cut along the line T-T in FIG. 3.

The rod portion 36 is a member having the same structure as the rod portion 34. As seen in FIG. 4, when viewed from x-direction, the rod portion 36 is located symmetrically to the rod portion 34 with respect to a surface S5 being parallel to x-direction and z-direction and passing the center of the light guide 30. The rod portion 36 functions in the same way as the rod portion 34, and a detailed description of the rod portion 36 is omitted.

The base 38 extends in x-direction along the rod portions 34 and 36 to support the rod portions 34 and 36 from the negative side in z-direction. The base 38 has supporting surfaces S6 to support the rod portions 34 and 36 respectively, and the supporting surfaces S6 are inclined from a surface S7 parallel to x-direction and y-direction so that light emitted from the rod portions 34 and 36 can be directed toward the document D.

Effects

The light guide 30 according to the embodiment can achieve proper light distribution. Specifically, in a light guide, a part of a reflecting surface illuminated with stronger light is easily influenced by even a minor manufacturing error of the reflecting element, and the quantity of light and the direction of light reflected by this part are variable, which is a cause of improper light distribution. As seen in FIG. 6, the area A illuminated with stronger light is located near the point light source. In each of the rod portions 34 and 36 of the light guide 30, therefore, the reflecting elements 42 provided in the part of the rod portion closer to the point light source 22 than the center thereof with respect to x-direction are arranged to avoid the strongly illuminated area A. That is, in the light guide 30, none of the reflecting elements 40 is provided in the strongly illuminated areas A. Accordingly, in the light guide 30, light coming to the strongly illuminated areas A is hardly reflected, and improper light distribution can be prevented.

Figure 8:
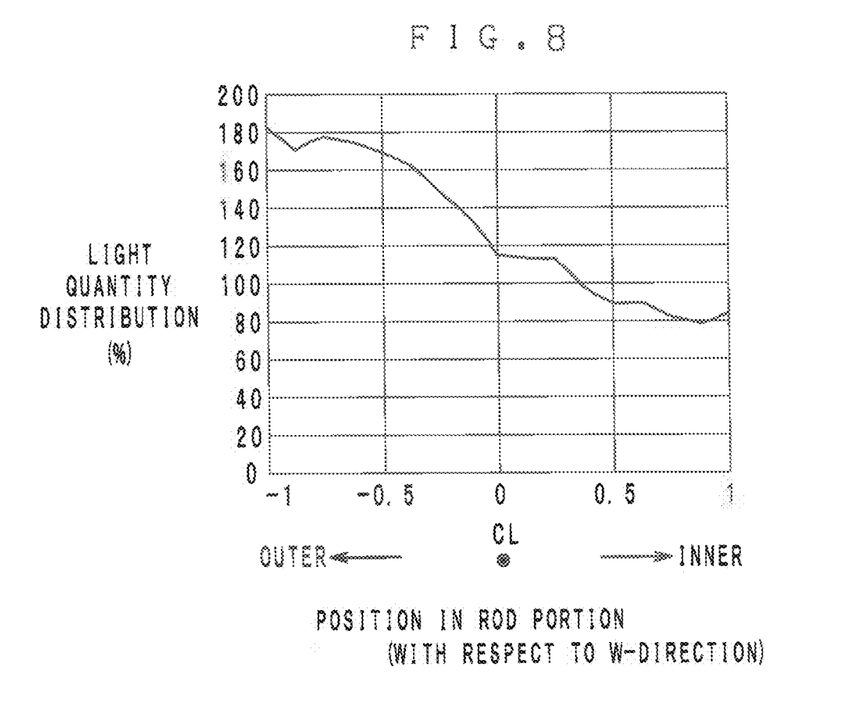
FIG. 8 is a graph indicating light quantity distribution on a cross section cut along the line Q-Q in FIG. 6.

In each of the rod portions 34 and 36 of the light guide 30, as seen in FIG. 8, the area A is in the outer portion of the reflecting surface S4. Therefore, the projections or dents 42 serving as the reflecting elements 40 are arranged to sheer away from the strongly illuminated area A in w direction. In other words, on the reflecting surface S4 of each of the rod portions 34 and 36, the reflecting elements 40 are provided in a portion adjacent to the strongly illuminated area A in w-direction. In the light guide 30, therefore, the portions of the reflecting surfaces S4 adjacent to the areas A in w-direction can be used as effective areas to obtain linear light. Hence, with the light guide 30, proper light distribution can be achieved.

First Modification; See FIG. 9

Figure 9:
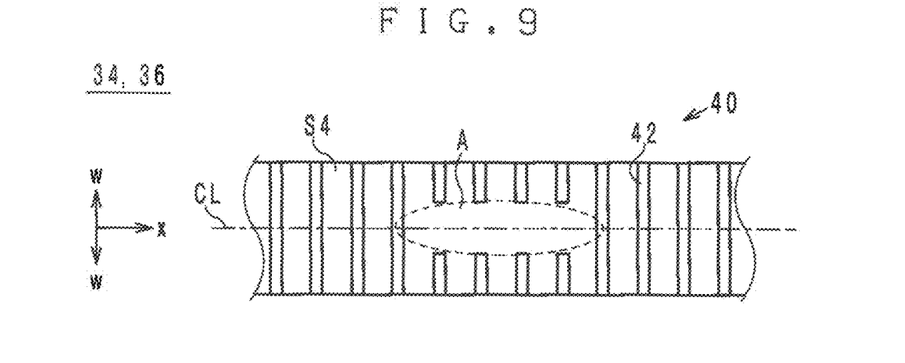
FIG. 9 is a view illustrating reflecting elements of a light guide according to a first modification.

An image reading apparatus 1A according to a first modification differs from the image reading apparatus 1 in the reflecting elements 40 formed in the rod portions 34 and 36 of the light guide 30. In the image reading apparatus 1A according to the first modification, as illustrated in FIG. 9, around the strongly illuminated area A in each of the rod portions 34 and 36, the projections or dents 42, which serve as the reflecting elements 40, are arranged along the both sides of the reflecting surface S4 so as to be symmetrical with respect to the center line CL dividing the reflecting surface S4 into two halves in w-direction. In the image reading apparatus 1A, thus, around the area A in each of the rod portions 34 and 36 of the light guide 30, each of the linear projections or dents 42 parallel to w-direction is divided. This is effective in a case in which the strongly illuminated area A is around the center of the reflecting surface S4 with respect to w-direction, and in this case, the reflecting elements 40 are provided to avoid the area A. Thus, in the image reading apparatus 1A, in a case in which the strongly illuminated areas A are around the respective centers of the reflecting surfaces S4 of the rod portions 34 and 36 with respect to w-direction, light coming to the strongly illuminated areas A is hardly reflected, and improper light distribution can be prevented. Meanwhile, the portions adjacent to the areas A of the reflecting surfaces S4 in w-direction can be used as effective areas to obtain linear light, and proper light distribution can be maintained.

Second Modification; See FIG. 10

Figure 10:
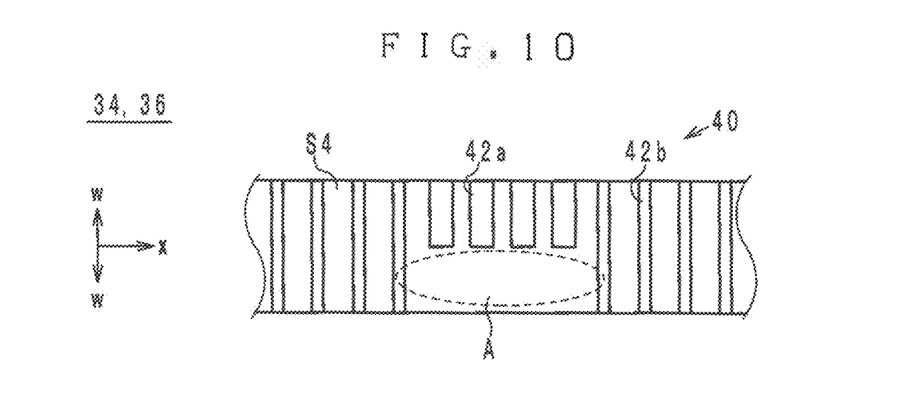
FIG. 10 is a view illustrating reflecting elements of a light guide according to a second modification.

An image reading apparatus 1B according to a second modification differs from the image reading apparatus 1 in the square measures of the projections or dents 42 (reflecting elements 40) in the portion adjacent to the area A in each of the rod portions 34 and 36 of the light guide 30. In the image reading apparatus 1B according to the second modification, as illustrated in FIG. 10, in each of the rod portions 34 and 36 of the light guide 30, the square measure of each of the projections or dents 42a arranged in the portion adjacent to the area A in w-direction is greater than the square measure of each projection or dent 42b provided in the other portions of the reflecting surface S4.

The image reading apparatus 1B having the structure above can achieve more proper light distribution than the image reading apparatus 1. Specifically, when the reflecting elements 40 in each of the rod portions 34 and 36 are arranged so as to avoid the strongly illuminated area A, the total square measure of the reflecting elements 40 on the reflecting surface S4 is decreased by the square measure of the area A. This may cause too large a decrease in the quantity of light reflected by the parts of the reflecting elements 40 near the areas A and emerging from the light guide 30. In the image reading apparatus 1B, however, in each of the rod portions 34 and 36, the square measure of each of the projections or dents 42a (reflecting elements 40) in the portion adjacent to the area A is greater than the square measure of each projection or dent 42b in the other portions. This arrangement prevents too large a decrease in the quantity of light reflected by the parts of the reflecting elements 40 near the areas A and emerging from the light guide 30. Consequently, the image reading apparatus 1B can achieve more proper light distribution than the image reading apparatus 1 according to the embodiment.

Other Embodiments

Figure 11:
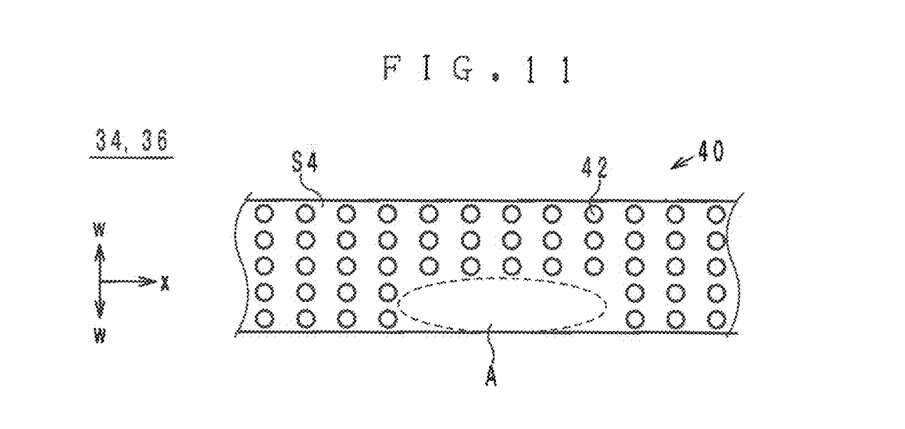
FIG. 11 is a view illustrating reflecting elements of a light guide according to another embodiment.

Light guides, illuminating devices and image reading apparatuses according to the present invention are not limited to the embodiments described above. For example, the reflecting elements 40 do not need to be linear projections or dents and may be dots as illustrated in FIG. 11 or alternatively may be a white pattern provided on the reflecting surface S4 by coating or printing. The number of rod portions does not need to be two. Instead of the two rod portions, one rod portion and one mirror may be provided such that light emergent from the rod portion is reflected by the mirror. Alternatively, three or more rod portions may be provided. Further, the structures of the image reading apparatuses 1, 1A and 1B may be combined.

Although the present invention has been described in connection with the preferred embodiments, it is to be noted that various changes and modifications would be obvious to those who are skilled in the art. Such changes and modifications are to be understood as being within the present invention.

What is claimed is:

1. A light guide configured to cause light entering from a point light source to exit as linear light, the light guide comprising:

A rod portion extending in a first direction and having a reflecting surface on which a plurality of reflecting elements are provided in different patterns to reflect the light entering from the point light source, wherein parts of the reflecting elements in a first of the different patterns are sheered away from an area in a second direction parallel to the reflecting surface and perpendicular to the first direction, wherein the area is illuminated more strongly than a remainder of the reflecting surface, the first of the different patterns is located closer to the point light source than a different, second one of the different patterns of reflecting elements which is located at a center of the rod portion with respect to the first direction, and the area is illuminated with light entering the rod portion.

2. The light guide according to claim 1, wherein:
the reflecting elements are linear members parallel to the second direction when viewed from a third direction perpendicular to the reflecting surface; and
in the first pattern at least one of the reflecting elements located adjacent to the illuminated area in the second direction is shorter than other reflecting elements.

3. The light guide according to claim 1, wherein:
the reflecting elements are linear members parallel to the second direction when viewed from a third direction perpendicular to the reflecting surface; and
in the first pattern around the illuminated area, at least one of the reflecting elements is divided so as not to lie in the illuminated area.

4. The light guide according to claim 1, wherein the reflecting elements in at least one of the patterns are dot-like members arranged regularly in the first direction and in the second direction when viewed from a third direction perpendicular to the reflecting surface.

5. The light guide according to claim 1, wherein the reflecting elements are projections or dents formed on the reflecting surface.

6. The light guide according to claim 1, wherein the reflecting elements are white members provided on the reflecting surface.

7. The light guide according to claim 1, wherein in the first pattern at least one of the reflecting elements adjacent to the illuminated area in the second direction has a greater square measure than one of the reflecting elements adjacent to the illuminated area in the first direction.

8. The light guide according to claim 1, wherein:
the rod portion is two in number,
the light guide further comprises a beam splitter configured to split the light entering from the point light source and to direct split light beams toward the two rod portions respectively; and
the illuminated area is an area of the reflecting surface illuminated with light entering from the point light source directly and with light entering from the point light source via the beam splitter.

9. The light guide according to claim 8, wherein the illuminated area is located in an outer portion of the light guide from a center line CL dividing the reflecting surface into two parts in the second direction.

10. The light guide according to claim 1, wherein:
the rod portion is two in number,
the light guide further comprises a beam splitter configured to split the light entering from the point light source and to direct split light beams toward the two rod portions respectively; and
the illuminated area is located, with respect to the first direction, substantially in a same position as an end of the beam splitter on an opposite side from the point light source.

11. An illuminating device comprising:
a point light source; and
the light guide according to claim 1.

12. An image reading apparatus comprising:
the illuminating device according to claim 11; and
an image pick-up element configured to receive light emitted from the point light source and reflected by a document.

13. The image reading apparatus according to claim 12, wherein:
the rod portion is two in number, the light guide further comprises a beam splitter configured to split the light entering from the point light source and to direct split light beams toward the two rod portions respectively; and
the illuminated area is an area of the reflecting surface illuminated with light incoming from the point light source directly and with light incoming from the point light source via the beam splitter.

14. The illuminating device according to claim 11, wherein:
the rod portion is two in number, the light guide further comprises a beam splitter configured to split the light entering from the point light source and to direct split light beams toward the two rod portions respectively; and
the illuminated area is an area of the reflecting surface illuminated with light incoming from the point light source directly and with light incoming from the point light source via the beam splitter.

* * * * *